June 23, 1925.
N. CARTER ET AL
SHOCK ABSORBER FOR AUTOMOBILES
Filed July 16, 1924
1,543,098
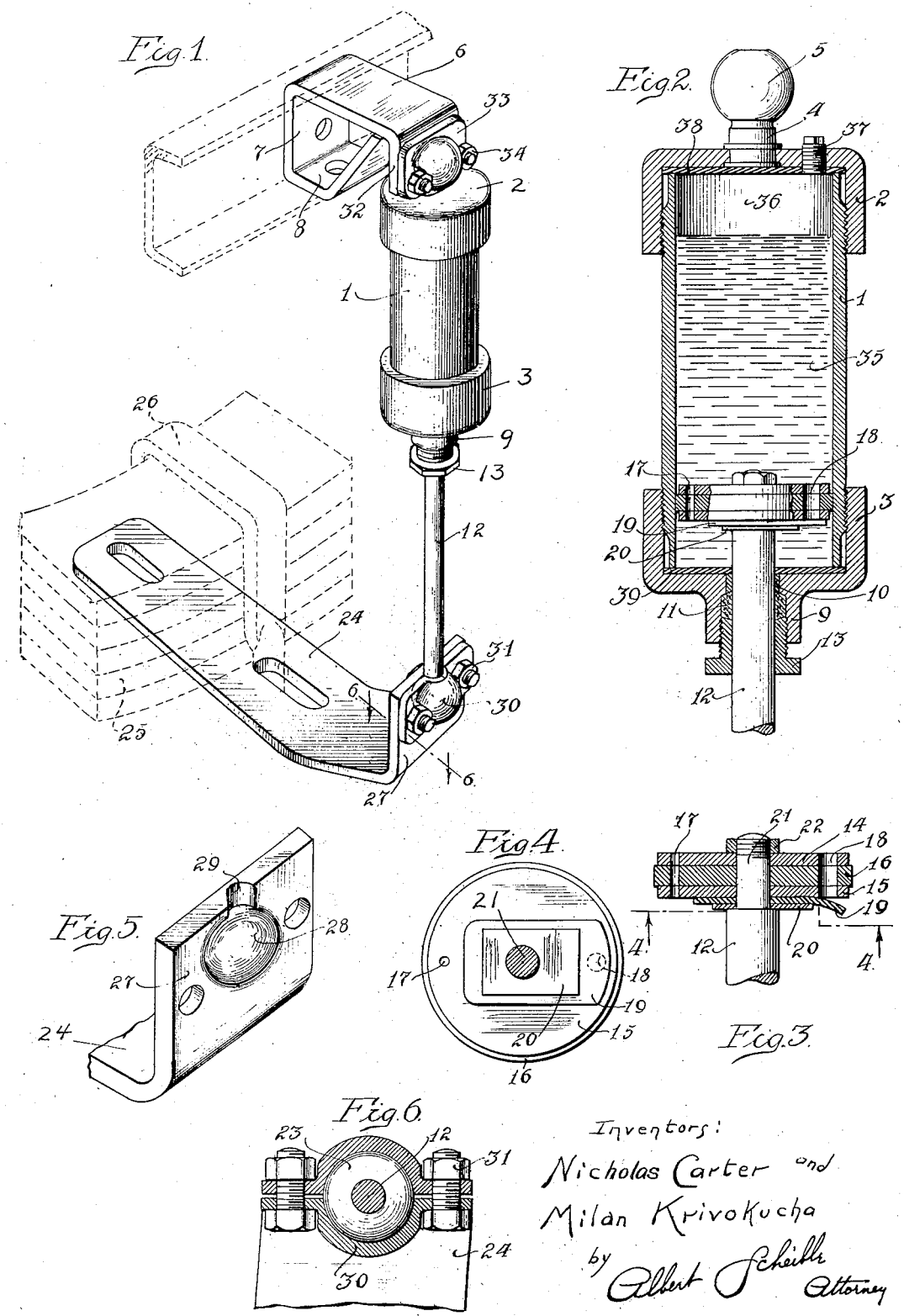
Inventors:
Nicholas Carter and
Milan Krivokucha
by Albert Scheible
Attorney Patented June 23, 1925.

1,543,098

UNITED STATES PATENT OFFICE.

NICHOLAS CARTER AND MILAN KRIVOKUCHA, OF CHICAGO, ILLINOIS.

SHOCK ABSORBER FOR AUTOMOBILES.

Application filed July 16, 1924. Serial No. 726,253.

*To all whom it may concern:*

Be it known that we, NICHOLAS CARTER, a citizen of Austria, and MILAN KRIVOKUCHA, a citizen of the United States, both residing at Chicago, in the county of Cook and State of Illinois, have invented certain new and useful Improvements in a Shock Absorber for Automobiles; and we do hereby declare the following to be a full, clear, and exact description of the invention, such as will enable others skilled in the art to which it appertains to make and use the same.

Our invention relates to shock absorbers and particularly to the class of shock absorbers employed on automobiles for checking the rebound after the wheels of a vehicle have passed over any sudden irregularity in the street or road over which the automobile is traveling.

For this purpose, our invention aims to provide a shock absorber which will yieldingly resist the downward movement of the body of the automobile and which will instantly and more strongly resist the subsequent upward rebound of the vehicle body. It also aims to provide a shock absorber for this purpose which will be exceedingly simple and strong in construction, and which will be self-lubricating as to its operating portions. Furthermore, our invention aims to provide a shock absorber which can readily be attached even by inexperienced persons to standard types of automobiles, and aims to provide it with attaching means affording a free suspension of the shock absorber proper so as to allow for the normal shifting of the relative positions of the vehicle parts between which the shock absorber is interposed.

Still further and also more detailed objects will appear from the following specification and from the accompanying drawings, in which Fig. 1 is a perspective view of a shock absorber embodying our invention, including dotted lines showing portions of a vehicle between which this shock absorber is interposed.

Fig. 2 is an enlarged central and vertical section through the main portion of the shock absorber of Fig. 1, with portions of the piston head broken away to show the ports in this head and the port-closing flap as the latter appears when the piston is moving downwardly with respect to the cylinder.

Fig. 3 is an enlarged central and vertical section through the head end of the piston showing the position of the port-closing flap when the piston is moving upwardly with respect to the cylinder and showing the method of assembling the piston head and the adjacent parts.

Fig. 4 is a horizontal section looking upwards and taken from the line 4—4 of Fig. 3.

Fig. 5 is a fragmentary enlarged view of the socketing end of the clamp in which the free end of the piston rod is swiveled.

Fig. 6 is an enlarged section taken through the axis of the two bolts in the same figure in the plane of the line 6—6 of Fig. 1.

In the embodiment of the drawings, our shock absorber includes a casing having a cylindrical wall 1 and having caps 2 and 3 threaded respectively upon its upper and lower ends. Secured to the upper cap 2 is a supporting shank 4 which carries at its upper end a ball 5 adapted to form part of a ball-and-socket connection to a bracket 6.
This bracket has two parts 7 and 8 each provided with a hole for receiving a bolt, thereby adapting this clamp to be secured to chassis or vehicle body portions of various shapes.

The cap 3 at the lower end of the cylinder has a tubular extension 9 provided with an interior shoulder 10 against which loose packing 11 can be clamped against the stem 12 of a piston by means of a bushing 13 threaded into the said tubular extension 9, thereby affording an effective stuffing box. The piston stem 12 is fastened at its upper end to a piston head which desirably comprises a pair of metal disks 14 and 15 clamping a leather disk 16 between them, this leather disk being of a diameter slidably fitting the bore of the cylinder tube 1 while the metal disks 14 and 15 are both slightly smaller than this diameter.

Extending vertically through the piston head are a pair of ports 17 and 18, the latter being desirably considerably larger in diameter than the port 17. Adjacent to the bottom of the cylinder head and overlapping the lower end of the larger port 18 is a flexible flap 19 of leather or the like which is adapted to close the lower end of the port 18 as shown in Fig. 2 and which may also be flexed away from that port as shown in Fig. 3 so as to permit the passage of liquid through the said larger port 18. To prevent an excessive flexing of this flap, we desirably provide a stiffener 20 under the said flap, which stiffener is desirably of metal. This stiffener terminates radially inward of the piston from the said port 18, so that it limits the flexing of the flap to the portion adjacent to the port 18 and prevents the flap from flexing to such an extent that it would not promptly close the port 18 when the piston moves downward with respect to the cylinder as hereafter described. To facilitate such an assembly, we desirably reduce the upper end of the piston rod or stem 12 so as to afford a stem portion 21 of smaller diameter than the main portion of this stem. This smaller diametered stem portion 21 extends successively through alined bores in the stiffener 20, the flexible flap 19, the lower metal disk 15, the leather disk 16 and the upper metal disk 14. Then we thread the upper end of this piston stem portion 21 to receive a nut 22 which clamps the said perforated parts against the shoulder at the juncture of the stem portions 12 and 21.

The lower end of the piston stem 12 is provided with a ball-shaped enlargement 23 which is socketed in one end of a lower attaching clamp 24, this clamp being constructed so that it can readily be attached to another vehicle portion, as for example by attaching it to a body spring 25 by a U-bolt 26 after the manner shown in Fig. 1. To provide the needed ball and socket connection for this purpose, we desirably provide the said lower attaching clamp with a riser portion 27 having a substantially hemispherical recess 28 in its outer face, this recess being continued to the top of the clamp by a substantially semi-cylindrical groove 29 of a diameter somewhat larger than the stem 12. Then we provide a companion socket piece 30 having a hollow hemispherical portion facing the said hemispherical depression 28, this clamping piece 30 being secured to the riser 27 by bolts 31 as shown in Fig. 1. The upper attaching clamp has a free end 32 extending downwardly and formed similar to the recessed riser of the lower attaching clamp but directed downwardly, and this upper clamp also includes a companion socket piece 33 formed similarly to the part 30 and bolted to the part 32 by bolts 34.

When in use, the cylinder of our shock absorber is partly filled with a liquid 35, which desirably is a lubricating oil, and the top of this liquid terminates at some distance below the lower face of the cap 2 so as to provide an air space 36 above the oil. To allow for this oil filling, we provide the cap 2 with a threaded opening which is normally closed by a plug 37. We also desirably interpose packing disks 38 and 39 between the ends of the cylindrical tube 1 and the two caps 2 and 3, so that these will cooperate with the packing 11 in effectively sealing the casing in which the piston head is slidable and through the lower end of which casing the piston stem 12 extends.

In manufacturing such a shock absorber for any given type of vehicle, the lengths of the cylinder tube 1 and the piston stem 12 are so proportioned that the piston head will be near the lower end of the cylinder, approximately as shown in Fig. 2, when the vehicle is traveling along a smooth road so that the springs of the vehicle hold the chassis at a substantially normal height above the running gear. When the wheel adjacent to the shock absorber strikes a bump, the sudden lifting action on this wheel and the corresponding axle will move the lower attaching clamp and the piston stem upwardly, thereby causing the piston head to slide upwardly in the cylinder. This upward movement of the piston head will be resisted by the compressing of the air 36 above the oil and more particularly by the limited size of the ports 17 and 18 through which the oil must flow in passing from above the piston head to the space below the piston head. During such an upward movement of the piston head (or a corresponding downward movement of the cylinder with respect to the head) the pressure of the oil through the larger port 18 immediately flexes the flap 19, as to a position corresponding substantially to that of Fig. 3, so that oil will pass through this larger port as well as through the smaller port 17. Consequently, the relative upward movement of the piston with respect to the cylinder is merely slowed down to the rate at which oil can pass jointly through both of the ports 17 and 18.

However, when the rebound causes the piston to be drawn in the opposite direction or downwardly with respect to the cylinder, the upward pressure of the oil on the lower face of the flap 19 immediately returns this to its closure position of Fig. 2, thereby shutting off the larger port 18 and only permitting the oil to flow upwardly through the smaller port 17. Consequently, this rebound movement is much more severely checked, and by suitably proportioning the sizes of the two ports we can readily secure the desired difference in the checking effect of our shock absorber as to both the initial and the rebound movements. During these movements, the upper and lower ball-and-socket joints will not remain in the same relative positions, particularly if either the axle or the vehicle body are considerably tilted, but the ball and socket mountings automatically allow for such changes without cramping or overstraining any of the parts.

By employing a lubricating oil as the liquid in the cylinder, we also provide for a suitable lubrication of the piston stem, thereby insuring a free and easy movement of the piston in ready response to the jolts and the rebounds encountered when the vehicle is traveling even over rough roads. Additional oil can readily be introduced at any time by merely removing the plug 37, but we desirably provide a considerable air space 36 at all times above the oil so as to aid in the cushioning action and to avoid the shock which would occur with a sudden upward movement of the piston if the cylinder were entirely filled with oil. We also desirably employ four such shock absorbers on each vehicle, although we have found in practice that even if only two are employed at the rear of the vehicle, the shocks due to rough roads are greatly reduced. Furthermore, we have found that with our shock absorbers arranged as described, an increased loading of the vehicle body will assist in checking the rebound. Consequently, our shock absorbers are equally effective with lightly loaded and well filled automobiles, thus requiring no adjustment according to the load on the vehicle.

However, while we have illustrated and described our invention in a highly desirable embodiment including certain types of attaching clamps and including an exceedingly simple flexible flap as the check valve or closure member for restricting the rate at which liquid can pass the piston head, and have also mentioned certain materials as desirable for the corresponding parts, we do not wish to be limited to these or other details of the construction and arrangement thus disclosed. Obviously, these might all be modified in many ways without departing either from the spirit of our invention or from the appended claims.

We claim as our invention:—

1. A shock absorber comprising a cylinder partly filled with a liquid, a piston having a head slidable in the cylinder and a stem extending slidably through one head of the cylinder, the piston head having a continuously open port extending through it and also a relatively larger port extending through it, and a check valve disposed for opening and closing the said larger port according as the piston is moving in one direction or the other, the check valve comprising a flexible flap having one face adapted to bear against one face of the piston head, the flap being adapted to be flexed away from the said face by the flow of liquid through the said larger port, and a stiffening member engaging a part of the flap to limit the flexing of the flap.

2. A shock absorber comprising a cylinder partly filled with a liquid, a piston having a head slidable in the cylinder and a stem extending slidably through one head of the cylinder, the piston head having a continuously open port extending through it and also a relatively larger port extending through it, and a check valve disposed for opening and closing the said larger port according as the piston is moving in one direction or the other, the check valve comprising a flexible flap having one face adapted to bear against one face of the piston head, the flap being adapted to be flexed away from the said face by the flow of liquid through the said larger port, and a stiffening member engaging the outer face of the flap and terminating radially inward of the piston from the said larger port.

3. A shock absorber comprising a cylinder partly filled with a liquid, a piston having a head slidable in the cylinder and a stem extending slidably through one head of the cylinder, the piston head having a continuously open port extending through it and also a relatively larger port extending through it, and a check valve disposed for opening and closing the said larger port according as the piston is moving in one direction or the other, the check valve comprising a flexible flap having one face adapted to bear against one face of the piston head, the flap being adapted to be flexed away from the said face by the flow of liquid through the said larger port, the stem having a shoulder formation, and a stiffening member clamped between the flap and the said shoulder formation and engaging a portion of the flap radially inward of the piston from the said larger port.

4. A shock absorber comprising a vertical cylinder having a closed upper end and a bore in its lower end, a lubricating liquid partially filling the cylinder and affording an air space between the top of the liquid and the upper end of the cylinder, a piston having its head slidable in the cylinder and normally within the liquid and having its stem extending slidably through the said bore, means respectively connecting the upper end of the cylinder and the lower end of the piston stem to superposed part of the vehicle which are relatively vertically movable, the piston head having means associated therewith for permitting the passage of the liquid through the same, and check means associated with the piston head for restricting the said passage-affording means when the piston head moves in one direction with respect to the cylinder.

Signed at Chicago, Illinois, July 12th, 1924.

NICHOLAS CARTER.
MILAN KRIVOKUCHA.